(12) United States Patent
Scrivens et al.

(10) Patent No.: US 8,889,572 B2
(45) Date of Patent: Nov. 18, 2014

(54) GRADIENT NANOFIBER NON-WOVEN

(75) Inventors: Walter A. Scrivens, Moore, SC (US); Hao Zhou, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 821 days.

(21) Appl. No.: 12/893,010

(22) Filed: Sep. 29, 2010

(65) Prior Publication Data

US 2012/0077404 A1 Mar. 29, 2012

(51) Int. Cl.
| | |
|---|---|
| *D04H 3/005* | (2012.01) |
| *D04H 3/016* | (2012.01) |
| *D04H 3/147* | (2012.01) |
| *D01D 5/40* | (2006.01) |
| *B32B 5/02* | (2006.01) |
| *D01F 6/44* | (2006.01) |
| *D01F 6/88* | (2006.01) |
| *D04H 1/4391* | (2012.01) |
| *D04H 3/018* | (2012.01) |

(52) U.S. Cl.
CPC *D01D 5/40* (2013.01); *B32B 5/022* (2013.01); *D01F 6/44* (2013.01); *D01F 6/88* (2013.01); *D04H 1/4391* (2013.01); *D04H 3/016* (2013.01); *D04H 3/018* (2013.01)
USPC ............................ 442/340; 442/347; 442/409

(58) Field of Classification Search
CPC ............ B32B 2262/00; B32B 2262/02; B32B 2262/12; B32B 2262/14; D04H 1/00; D04H 1/42; D04H 1/4382; D04H 3/00; D04H 3/005; D04H 3/016; B82Y 5/00; B82Y 30/00; B82Y 99/00
USPC ......... 442/340, 344, 347, 364, 409, 411, 334, 442/341, 350, 351, 415; 264/210.1, 210.8, 264/211, 211.12, 211.13, 211.16, 211.19; 977/900
See application file for complete search history.

(56) References Cited

U.S. PATENT DOCUMENTS

| | | | |
|---|---|---|---|
| 3,953,566 A | 4/1976 | Gore | 264/288 |
| 3,956,020 A | 5/1976 | Weininger et al. | 136/146 |
| 3,973,068 A | 8/1976 | Weber | 428/198 |

(Continued)

FOREIGN PATENT DOCUMENTS

| | | | |
|---|---|---|---|
| CN | 101509153 A | * | 8/2009 |
| EP | 1 983 286 | | 8/2008 |

(Continued)

OTHER PUBLICATIONS

Patent Cooperation Treaty PCT International Search Report. Date of Mailing, Oct. 24, 2011. International Application No. PCT/US2011/041432. International filing date, Jun. 22, 2011.

*Primary Examiner* — Cheryl Juska
(74) *Attorney, Agent, or Firm* — Cheryl J. Brickey

(57) ABSTRACT

A gradient nanofiber non-woven contains a plurality of nanofibers where at least 70% of the nanofibers are bonded to other nanofibers. The nanofibers each have a surface and a center and contain a bulk polymer and a third component. The majority by weight at the surface of the nanofiber is the third component and the majority by weight at the center of the nanofiber is the bulk polymer and there is a concentration gradient from most concentrated to least from the surface of the nanofiber to the center of the nanofiber. The process for forming a gradient nanofiber non-woven is also disclosed.

18 Claims, 2 Drawing Sheets

(56) References Cited

U.S. PATENT DOCUMENTS

| | | | |
|---|---|---|---|
| 4,008,344 A | 2/1977 | Okamoto et al. | 427/307 |
| 4,070,218 A * | 1/1978 | Weber | 156/167 |
| 4,197,148 A | 4/1980 | Shinomura | 156/79 |
| 4,203,847 A | 5/1980 | Grandine, 2nd | 210/490 |
| 4,629,563 A | 12/1986 | Wrasidlo | 210/500.34 |
| 4,632,873 A | 12/1986 | Mizuno et al. | 428/364 |
| 4,640,962 A | 2/1987 | Ostrozynski et al. | 525/474 |
| 4,874,567 A | 10/1989 | Lopatin et al. | 264/45.1 |
| 5,051,183 A | 9/1991 | Takita et al. | 210/500.36 |
| 5,069,970 A | 12/1991 | Largman et al. | 428/373 |
| 5,093,197 A | 3/1992 | Howard et al. | 428/372 |
| 5,114,631 A | 5/1992 | Nyssen et al. | 264/6 |
| 5,126,219 A | 6/1992 | Howard et al. | 429/252 |
| 5,158,721 A | 10/1992 | Allegrezza, Jr. et al. | 264/22 |
| 5,208,098 A | 5/1993 | Stover | 428/284 |
| 5,230,843 A | 7/1993 | Howard et al. | 264/41 |
| 5,230,949 A | 7/1993 | Howard et al. | 428/224 |
| 5,238,618 A | 8/1993 | Kinzer | 264/41 |
| 5,260,003 A | 11/1993 | Nyssen et al. | 264/6 |
| 5,476,589 A | 12/1995 | Bacino | 210/500.36 |
| 5,522,991 A | 6/1996 | Tuccelli et al. | 210/490 |
| 5,814,405 A | 9/1998 | Branca et al. | 428/311.51 |
| 5,840,234 A | 11/1998 | Ito et al. | 264/205 |
| 5,885,456 A | 3/1999 | Charkoudian et al. | 210/500.41 |
| 6,368,742 B2 | 4/2002 | Fisher et al. | 429/145 |
| 6,399,188 B1 | 6/2002 | Smith et al. | 428/313.5 |
| 6,520,425 B1 | 2/2003 | Reneker | 239/294 |
| 6,555,945 B1 * | 4/2003 | Baughman et al. | 310/300 |
| 6,777,496 B2 | 8/2004 | Patel et al. | 525/177 |
| 6,824,716 B2 | 11/2004 | Liao et al. | 264/49 |
| 6,890,872 B2 | 5/2005 | Bond et al. | 442/414 |
| 6,994,811 B2 | 2/2006 | Kools | 264/41 |
| 7,276,166 B2 * | 10/2007 | Koslow | 210/650 |
| 7,356,229 B2 | 4/2008 | Ouderkirk et al. | 385/115 |
| 7,356,231 B2 | 4/2008 | Ouderkirk et al. | 385/123 |
| 7,390,760 B1 | 6/2008 | Chen et al. | 442/341 |
| 7,406,239 B2 | 7/2008 | Ouderkirk et al. | 385/131 |
| 7,537,807 B2 | 5/2009 | Craighead et al. | 427/458 |
| 7,575,767 B2 * | 8/2009 | May et al. | 424/776 |
| 7,599,592 B2 | 10/2009 | Benson, Jr. et al. | 385/122 |
| 7,776,405 B2 * | 8/2010 | Bailey et al. | 427/483 |
| 7,794,634 B2 * | 9/2010 | Ripoll et al. | 264/10 |
| 7,828,539 B1 * | 11/2010 | Beachley et al. | 425/115 |
| 8,257,641 B1 * | 9/2012 | Qi et al. | 264/465 |
| 8,318,617 B2 * | 11/2012 | Blankenbeckler | 442/334 |
| 8,349,449 B2 * | 1/2013 | Privitera et al. | 428/364 |
| 8,361,180 B2 * | 1/2013 | Lim et al. | 55/486 |
| 8,580,181 B1 * | 11/2013 | Beachley et al. | 264/465 |
| 2002/0012793 A1 | 1/2002 | Tajima et al. | 428/364 |
| 2002/0073667 A1 | 6/2002 | Barris et al. | 55/486 |
| 2003/0106294 A1 | 6/2003 | Chung et al. | 55/486 |
| 2003/0195611 A1 | 10/2003 | Greenhalgh et al. | 623/1.15 |
| 2003/0217928 A1 | 11/2003 | Lin et al. | 205/109 |
| 2004/0060268 A1 | 4/2004 | Chung et al. | 55/482 |
| 2004/0060269 A1 | 4/2004 | Chung et al. | 55/482 |
| 2004/0096652 A1 | 5/2004 | Royer et al. | 428/364 |
| 2004/0123572 A1 | 7/2004 | Chung et al. | 55/482 |
| 2004/0187454 A1 | 9/2004 | Chung et al. | 55/482 |
| 2004/0241482 A1 | 12/2004 | Grah et al. | 428/518 |
| 2005/0112349 A1 | 5/2005 | Laurencin et al. | 428/292.4 |
| 2005/0131139 A1 | 6/2005 | Kaner et al. | 524/800 |
| 2005/0258562 A1 | 11/2005 | Wilson et al. | 264/130 |
| 2006/0019819 A1 | 1/2006 | Shao-Horn et al. | 502/4 |
| 2006/0047052 A1 | 3/2006 | Barrera et al. | 524/495 |
| 2006/0057350 A1 * | 3/2006 | Ochi et al. | 428/292.1 |
| 2006/0065021 A1 | 3/2006 | Khatri et al. | 65/393 |
| 2006/0094320 A1 * | 5/2006 | Chen et al. | 442/340 |
| 2006/0117730 A1 | 6/2006 | Chung et al. | 55/524 |
| 2006/0154063 A1 | 7/2006 | Fujihara et al. | 428/373 |
| 2006/0213829 A1 * | 9/2006 | Rutledge et al. | 210/503 |
| 2006/0226580 A1 * | 10/2006 | Xia et al. | 264/465 |
| 2006/0237694 A1 | 10/2006 | Kaner et al. | 252/500 |
| 2006/0292369 A1 * | 12/2006 | Rutledge et al. | 428/364 |
| 2007/0012007 A1 | 1/2007 | Chung et al. | 55/528 |
| 2007/0112115 A1 * | 5/2007 | Shalaby et al. | 524/431 |
| 2007/0113530 A1 * | 5/2007 | Morozov et al. | 55/527 |
| 2007/0207186 A1 * | 9/2007 | Scanlon et al. | 424/424 |
| 2007/0218279 A1 * | 9/2007 | Nonaka et al. | 428/365 |
| 2007/0259177 A1 | 11/2007 | Gupta et al. | 428/367 |
| 2008/0003168 A1 * | 1/2008 | Barrero Ripoll et al. | 423/447.2 |
| 2008/0014410 A1 | 1/2008 | Johnston et al. | 428/141 |
| 2008/0070463 A1 | 3/2008 | Arora et al. | 442/327 |
| 2008/0134652 A1 * | 6/2008 | Lim et al. | 55/486 |
| 2008/0149561 A1 | 6/2008 | Chu et al. | 210/500.38 |
| 2008/0160856 A1 * | 7/2008 | Chen et al. | 442/341 |
| 2008/0203358 A1 | 8/2008 | Bellamkonda et al. | 623/23.72 |
| 2008/0217807 A1 | 9/2008 | Lee et al. | 264/172.18 |
| 2008/0264259 A1 | 10/2008 | Leung | 96/143 |
| 2008/0274312 A1 * | 11/2008 | Schelling et al. | 428/34.5 |
| 2008/0274658 A1 * | 11/2008 | Simmonds et al. | 442/334 |
| 2008/0311815 A1 | 12/2008 | Gupta et al. | 442/351 |
| 2009/0004460 A1 | 1/2009 | Gruber et al. | 428/323 |
| 2009/0039565 A1 | 2/2009 | Reneker et al. | 264/515 |
| 2009/0042029 A1 | 2/2009 | Havel et al. | 428/372 |
| 2009/0042475 A1 | 2/2009 | Pourdeyhimi | 442/335 |
| 2009/0117803 A1 | 5/2009 | Jung et al. | 442/344 |
| 2009/0261035 A1 | 10/2009 | Arora et al. | 210/510.1 |
| 2009/0285718 A1 * | 11/2009 | Privitera et al. | 422/30 |
| 2009/0306775 A1 | 12/2009 | Macossay-Torres | 623/13.2 |
| 2009/0324925 A1 * | 12/2009 | Conley et al. | 428/311.51 |
| 2009/0326128 A1 | 12/2009 | Macossay-Torres | 524/413 |
| 2010/0028999 A1 | 2/2010 | Nain | 435/377 |
| 2010/0055154 A1 * | 3/2010 | Liao et al. | 424/443 |
| 2010/0218890 A1 * | 9/2010 | Gruber et al. | 156/278 |
| 2010/0275780 A1 * | 11/2010 | Bailey et al. | 95/285 |
| 2010/0291182 A1 * | 11/2010 | Palasis et al. | 424/426 |
| 2010/0297906 A1 * | 11/2010 | Steckl et al. | 442/347 |
| 2011/0092122 A1 | 4/2011 | Conley et al. | 442/189 |
| 2011/0177332 A1 * | 7/2011 | Park et al. | 428/364 |
| 2011/0177395 A1 | 7/2011 | Kamisasa | 429/246 |
| 2011/0183563 A1 * | 7/2011 | Ochi et al. | 442/201 |
| 2011/0232653 A1 | 9/2011 | Imashiro et al. | 128/863 |
| 2011/0250815 A1 * | 10/2011 | Pourdeyhimi | 442/341 |
| 2011/0280660 A1 * | 11/2011 | Bahukudumbi et al. | 405/63 |
| 2012/0015020 A1 * | 1/2012 | Pourdeyhimi et al. | 424/422 |
| 2012/0034461 A1 * | 2/2012 | Stevens | 428/375 |
| 2012/0074611 A1 * | 3/2012 | Zhou et al. | 264/164 |
| 2012/0074612 A1 * | 3/2012 | Scrivens et al. | 264/164 |
| 2012/0076972 A1 * | 3/2012 | Zhou et al. | 428/86 |
| 2012/0077015 A1 * | 3/2012 | Zhou et al. | 428/300.4 |
| 2012/0077405 A1 * | 3/2012 | Zhou et al. | 442/346 |
| 2012/0077406 A1 * | 3/2012 | Scrivens et al. | 442/351 |
| 2012/0091072 A1 * | 4/2012 | Kozlov et al. | 210/767 |
| 2012/0100772 A1 * | 4/2012 | Hummelgaard et al. | 442/327 |
| 2012/0109090 A1 * | 5/2012 | Reichardt et al. | 604/370 |
| 2012/0122363 A1 * | 5/2012 | Owens | 442/181 |
| 2012/0148493 A1 * | 6/2012 | Schmehl et al. | 424/9.1 |
| 2012/0208421 A1 * | 8/2012 | Qi et al. | 442/334 |
| 2012/0318731 A1 * | 12/2012 | Elbahri et al. | 210/500.25 |
| 2013/0112625 A1 * | 5/2013 | Bahukudumbi et al. | 210/660 |

FOREIGN PATENT DOCUMENTS

| | | | |
|---|---|---|---|
| JP | 2004162244 A * | 6/2004 | |
| JP | 2008088590 A * | 4/2008 | |
| KR | 2011099475 A * | 9/2011 | |
| WO | WO 2007/132943 | 11/2007 | |
| WO | WO 2008/028134 | 3/2008 | |
| WO | WO 2008/041183 | 4/2008 | |
| WO | WO 2009/002858 | 12/2008 | |
| WO | WO 2011143030 A2 * | 11/2011 | |
| WO | WO 2011162528 A2 * | 12/2011 | |

* cited by examiner

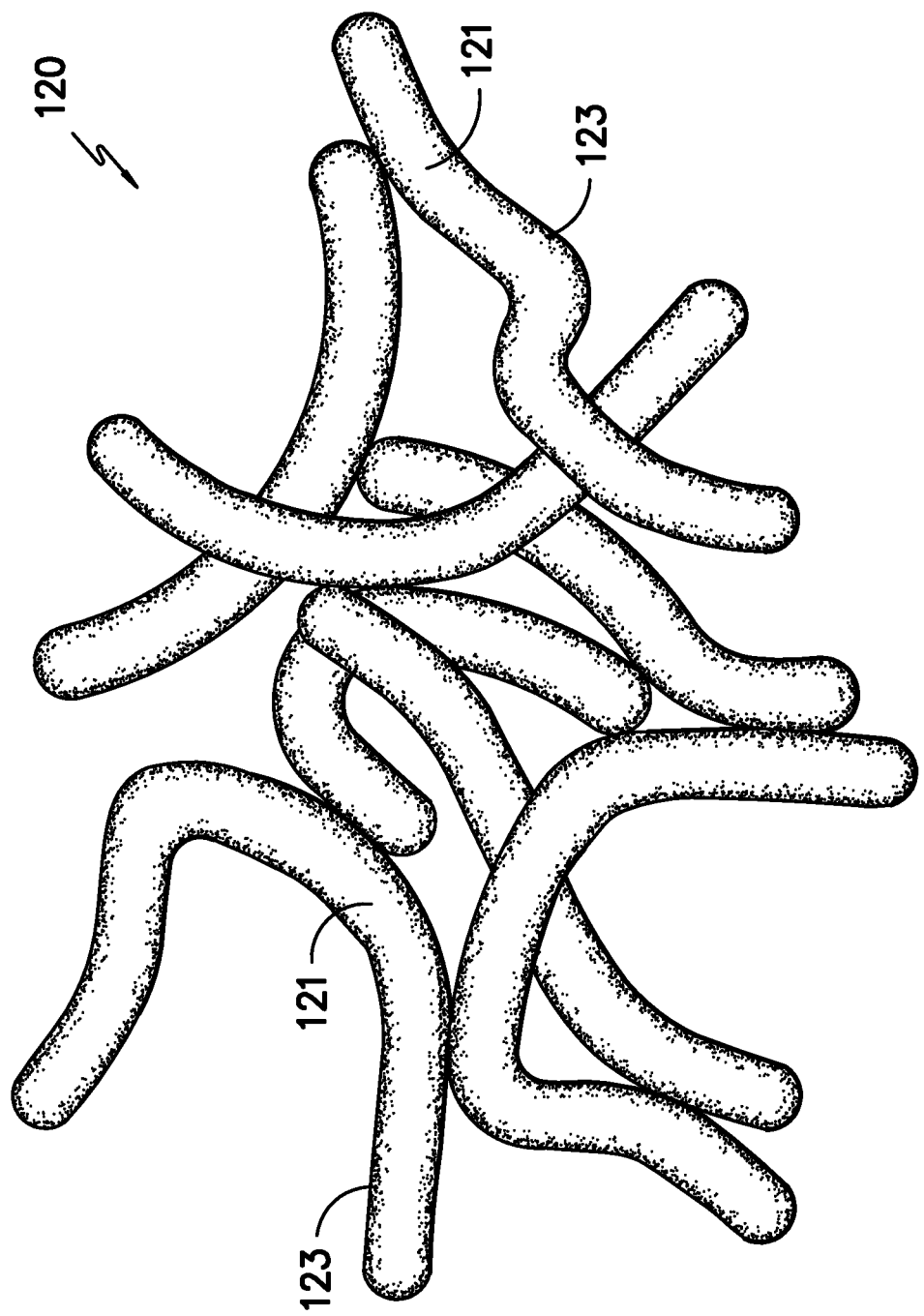
FIG. -1-

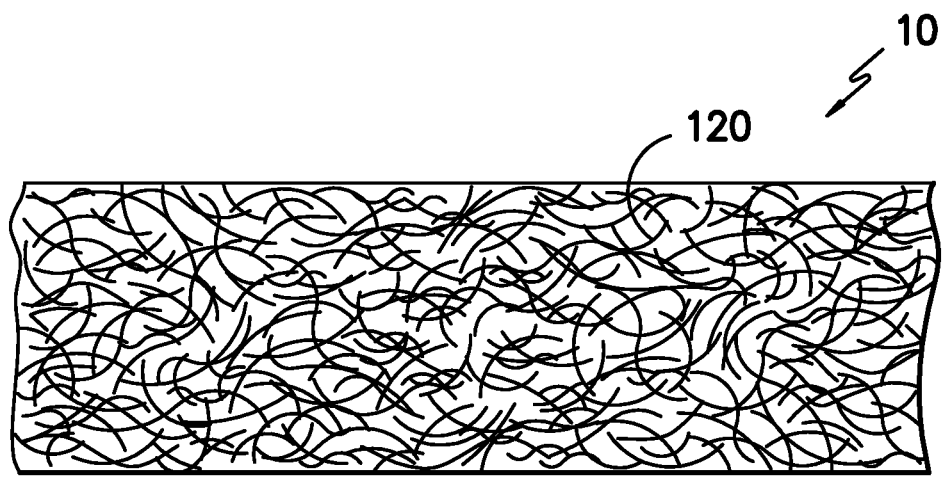
FIG. -2-
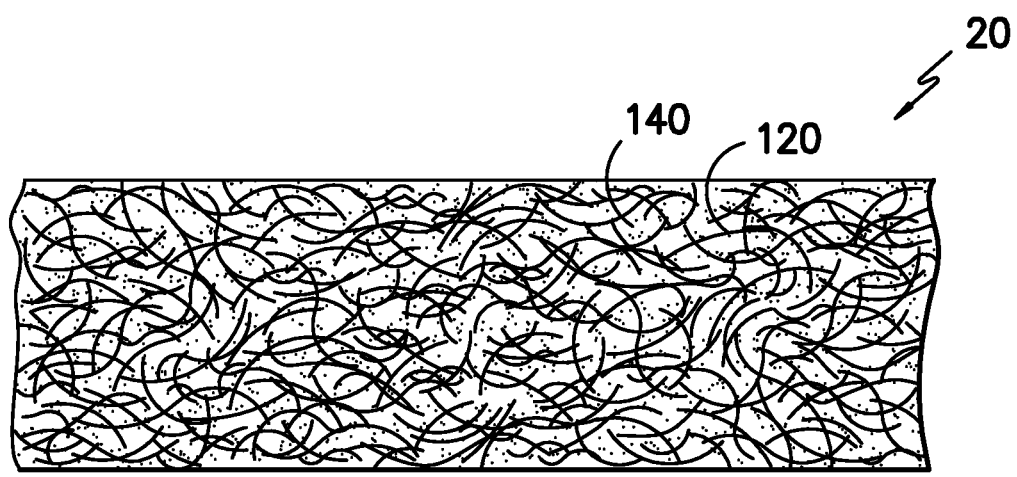
FIG. -3-

GRADIENT NANOFIBER NON-WOVEN

RELATED APPLICATIONS

This application is related to the following applications, each of which is incorporated by reference: U.S. patent application Ser. No. 12/893,021 entitled "Process of Forming Nano-Composite and Nano-Porous Non-Wovens", U.S. patent application Ser. No. 12/893,046 entitled "Core/Shell Nanofiber Non-Woven", U.S. patent application Ser. No. 12/893,028 entitled "Nanofiber Non-Wovens Containing Particles", now abandoned, U.S. patent application Ser. No. 12/893,041 entitled "Process of Forming a Nanofiber Nonwoven Containing Particles", now U.S. Pat. No. 8,795,561, U.S. patent application Ser. No. 12/893,030 entitled "Multi-Layer Nano-Composites", now abandoned, and U.S. patent application Ser. No. 12/893,035 entitled "Nanofiber Non-Woven Composite", now abandoned, each of which being filed on Sep. 29, 2010.

TECHNICAL FIELD

The present application is directed nanofiber non-wovens where the nanofibers contain a materials gradient through the radius of the nanofiber and the methods of making.

BACKGROUND

Nanofibers have a high surface area to volume ratio which alters the mechanical, thermal, and catalytic properties of materials. Nanofiber added to composites may either expand or add novel performance attributes to existing applications such as reduction in weight, breathability, moisture wicking, increased absorbency, increased reaction rate, etc. The market applications for nanofibers are rapidly growing and promise to be diverse. Applications include filtration, barrier fabrics, insulation, absorbable pads and wipes, personal care, biomedical and pharmaceutical applications, whiteners (such as $TiO_2$ substitution) or enhanced web opacity, nucleators, reinforcing agents, acoustic substrates, apparel, energy storage, etc. Due to their limited mechanical properties that preclude the use of conventional web handing, loosely interlaced nanofibers are often applied to a supporting substrate such as a non-woven or fabric material. The bonding of the nanofiber cross over points may be able to increase the mechanical strength of the nanofiber non-wovens which potentially help with their mechanical handling and offer superior physical performance.

Nanofibers having a material gradient along the radius of the nanofiber may be able to create a less blinding filter material which allows the potential use of less of the valuable nanofiber, provides a smooth distribution of fiber size distribution, excellent incorporation within substrate material. Thus, there is a need to provide a bonded nanofiber nonwoven where the nanofibers contain a material gradient along the radius of the nanofiber.

BRIEF SUMMARY

The present disclosure provides a gradient nanofiber nonwoven contains a plurality of nanofibers where at least 70% of the nanofibers are bonded to other nanofibers. The nanofibers each have a surface and a center and contain a bulk polymer and a third component. The majority by weight at the surface of the nanofiber is the third component and the majority by weight at the center of the nanofiber is the bulk polymer and there is a concentration gradient from most concentrated to least from the surface of the nanofiber to the center of the nanofiber. The process for forming a gradient nanofiber nonwoven is also disclosed.

BRIEF DESCRIPTION OF THE DRAWINGS

FIG. 1 illustrates the cross-section of FIG. 2 magnified to show the gradient within the nanofibers and the bonding between the nanofibers.

FIG. 2 illustrates a cross-section of one embodiment of a gradient nanofiber non-woven.

FIG. 3 illustrates a cross-section of one embodiment of a gradient nanofiber non-woven having a matrix.

DETAILED DESCRIPTION

"Nanofiber", in this application, is defined to be a fiber having a diameter less than 1 micron. In certain instances, the diameter of the nanofiber is less than about 900, 800, 700, 600, 500, 400, 300, 200 or 100 nm, preferably from about 10 nm to about 200 nm. In certain instances, the nanofibers have a diameter from less than 100 nm. The nanofibers may have cross-sections with various regular and irregular shapes including, but not limiting to circular, oval, square, rectangular, triangular, diamond, trapezoidal and polygonal. The number of sides of the polygonal cross-section may vary from 3 to about 16.

"Non-woven" means that the layer or article does not have its fibers arranged in a predetermined fashion such as one set of fibers going over and under fibers of another set in an ordered arrangement.

As used herein, the term "thermoplastic" includes a material that is plastic or deformable, melts to a liquid when heated and freezes to a brittle, glassy state when cooled sufficiently. Thermoplastics are typically high molecular weight polymers. Examples of thermoplastic polymers that may be used include polyacetals, polyacrylics, polycarbonates, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polymethylpentene (and co-polymers thereof), polynorbornene (and co-polymers thereof), polyethylene terephthalates, polyvinylidene fluorides, polysiloxanes, or the like, or a combination comprising at least one of the foregoing thermoplastic polymers. In some embodiments, polyolefins include polyethylene, poly($\alpha$-olefin)s. As used herein, poly($\alpha$-olefin) means a polymer made by polymerizing an alpha-olefin. An $\alpha$-olefin is an alkene where the carbon-carbon double bond starts at the $\alpha$-carbon atom. Exemplary poly($\alpha$-olefin)s include polypropylene, poly(I-butene) and polystyrene. Exemplary polyesters include condensation polymers of a $C_{2-12}$ dicarboxylic acid and a $C_{2-12}$ alkylenediol. Exemplary polyamides include condensation polymers of a $C_{2-12}$ dicarboxylic acid and a $C_{2-12}$ alkylenediamine, as well as polycaprolactam (Nylon 6).

Referring to FIG. 2, there is shown a gradient nanofiber non-woven 10 containing a plurality of gradient nanofibers 120 where at least 70% of the nanofibers are bonded to other nanofibers. FIG. 1 shows an enlargement of the gradient nanofiber non-woven 10 of FIG. 2 illustrating the bulk 121 and surface 123 of each of the gradient nanofibers 120 and how the nanofibers are bonded to one another. The concentration in the gradient nanofibers is of different materials from the surface 123 to the bulk 121. The shading of the Figure is to illustrate the concentration gradient. The majority of the surface 123 of the nanofiber 120 is the third component. The majority of the center 121 of the nanofiber 120 is the bulk polymer. The third component is in a gradient along the radius of the nanofiber 120 with the highest concentration being at the surface 123 of the nanofiber 121 and the lowest concentration of the third component being at the center 121 of the nanofiber 120.

The nanofibers each have a surface 123 and a center 121 and contain a bulk polymer and a third component. The majority by weight at the surface of the nanofiber is the third component and the majority by weight at the center of the nanofiber is the bulk polymer and there is a concentration gradient from most concentrated to least from the surface 123 of the nanofiber 120 to the center 121 of the nanofiber 120. This may occur when the third component blooms to the surface 123 of the nanofiber 121. Preferably, the surface (outside 5% of total radius of the nanofiber) of the nanofibers contains greater than 50% wt third component, more preferably greater than 70% wt, more preferably greater than 95% wt. Preferably, the center of the nanofibers contains greater than 50% wt bulk polymer, more preferably greater than 70% wt, more preferably greater than 95% wt.

In one embodiment shown in FIG. 3, the gradient nanofiber non-woven 10 may also contain a thermoplastic polymer forming the matrix 140, which is referred herein as the matrix polymer. The bulk polymer and matrix polymer may be formed of any suitable thermoplastic polymer that is melt-processable. The matrix polymer preferably is able to be removed by a condition to which the bulk polymer is not susceptible to and optionally the third component is not susceptible to. The most common case is the matrix polymer is soluble in a first solvent in which the bulk polymer is insoluble in. "Soluble" is defined as the state in which the intermolecular interactions between polymer chain segments and solvent molecules are energetically favorable and cause polymer coils to expand. "Insoluble" is defined as the state in which the polymer-polymer self-interactions are preferred and the polymer coils contract. Solubility is affected by temperature.

The first solvent may be an organic solvent, water, an aqueous solution or a mixture thereof. Preferably, the solvent is an organic solvent. Examples of solvents include, but are not limited to, acetone, alcohol, chlorinated solvents, tetrahydrofuran, toluene, aromatics, dimethylsulfoxide, amides and mixtures thereof. Exemplary alcohol solvents include, but are not limited to, methanol, ethanol, isopropanol and the like. Exemplary chlorinated solvents include, but are not limited to, methylene chloride, chloroform, tetrachloroethylene, carbontetrachloride, dichloroethane and the like. Exemplary amide solvents include, but are not limited to, dimethylformamide, dimethylacetamide, N-methylpyrollidinone and the like. Exemplary aromatic solvents include, but are not limited to, benzene, toluene, xylene (isomers and mixtures thereof), chlorobenzene and the like. In another embodiment, the matrix polymer may be removed by another process such as decomposition. For example, polyethylene terephthalate (PET) may be removed with base (such as NaOH) via hydrolysis or transformed into an oligomer by reacting with ethylene glycol or other glycols via glycolysis, or nylon may be removed by treatment with acid. In yet another embodiment, the matrix polymer may be removed via depolymerization and subsequent evaporation/sublimation of smaller molecular weight materials. For example, polymethyleneoxide, after deprotection, can thermally depolymerize into formaldehyde which subsequently evaporates/sublimes away.

The bulk polymer and matrix polymers are thermodynamically immiscible with each other. Common miscibility predictors for non-polar polymers are differences in solubility parameters or Flory-Huggins interaction parameters. For polymers with non-specific interactions, such as polyolefins, the Flory-Huggins interaction parameter may be calculated by multiplying the square of the solubility parameter difference by the factor (V/RT), where V is the molar volume of the amorphous phase of the repeated unit V=M/Δ (molecular weight/density), R is the gas constant, and T is the absolute temperature. As a result, the Flory-Huggins interaction parameter between two non-polar polymers is always a positive number. Thermodynamic considerations require that for complete miscibility of two polymers in the melt, the Flory-Huggins interaction parameter has to be very small (e.g., less than 0.002 to produce a miscible blend starting from 100,000 weight-average molecular weight components at room temperature). It is difficult to find polymer blends with sufficiently low interaction parameters to meet the thermodynamic condition of miscibility over the entire range of compositions. However, industrial experience suggests that some blends with sufficiently low Flory-Huggins interaction parameters, although still not miscible based on thermodynamic considerations, form compatible blends.

Preferably the viscosity and surface energy of the bulk polymer and the matrix polymer are close. Theoretically, a 1:1 ratio would be preferred. If the surface energy and/or the viscosity are too dissimilar, nanofibers may not be able to form. In one embodiment, the matrix polymer has a higher viscosity than the bulk polymer.

The bulk polymer and matrix polymer may be selected from any thermoplastic polymers that meet the conditions stated above, are melt-processable, and are suitable for use in the end product. Suitable polymers for either the bulk and matrix polymers include, but are not limited to polyacetals, polyacrylics, polycarbonates, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polymethylpentene (and co-polymers thereof), polynorbornene (and co-polymers thereof), polyethylene terephthalates, polyvinylidene fluorides, polysiloxanes, or the like, or a combination comprising at least one of the foregoing thermoplastic polymers. In some embodiments, polyolefins include polyethylene, cyclic olefin copolymers (e.g. TOPAS®), poly(α-olefin)s. As used herein, poly(α-olefin) means a polymer made by polymerizing an alpha-olefin. An α-olefin is an alkene where the carbon-carbon double bond starts at the α-carbon atom. Exemplary poly(α-olefin)s include polypropylene, poly(I-butene) and polystyrene. Exemplary polyesters include condensation polymers of a $C_{2-12}$ dicarboxylic acid and a $C_{2-12}$ alkylenediol. Exemplary polyamides include condensation polymers of a $C_{2-12}$ dicarboxylic acid and a $C_{2-12}$ alkylenediamine. Additionally, the bulk and/or matrix polymers may be copolymers and blends of polyolefins, styrene copolymers and terpolymers, ionomers, ethyl vinyl acetate, polyvinylbutyrate, polyvinyl chloride, metallocene polyolefins, poly(alpha olefins), ethylene-propylene-diene terpolymers, fluorocarbon elastomers, other fluorine-containing polymers, polyester polymers and copolymers, polyamide polymers and copolymers, polyurethanes, polycarbonates, polyketones, and polyureas, as well as polycaprolactam (Nylon 6).

In one embodiment, some preferred polymers are those that exhibit an alpha transition temperature (Tα) and include, for example: high density polyethylene, linear low density polyethylene, ethylene alpha-olefin copolymers, polypropylene, poly(vinylidene fluoride), poly(vinyl fluoride), poly(ethylene chlorotrifluoroethylene), polyoxymethylene, poly(ethylene oxide), ethylene-vinyl alcohol copolymer, and blends thereof. Blends of one or more compatible polymers may also be used in practice of the invention. Particularly preferred polymers are polyolefins such as polypropylene and polyethylene that are readily available at low cost and may provide highly desirable properties in the microfibrous articles used in the present invention, such properties including high modulus and high tensile strength.

Useful polyamide polymers include, but are not limited to, synthetic linear polyamides, e.g., nylon-6, nylon-6,6, nylon-11, or nylon-12. Polyurethane polymers which may be used include aliphatic, cycloaliphatic, aromatic, and polycyclic polyurethanes. Also useful are polyacrylates and polymethacrylates, which include, for example, polymers of acrylic acid, methyl acrylate, ethyl acrylate, acrylamide, methylacrylic acid, methyl methacrylate, n-butyl acrylate, and ethyl acrylate, to name a few. Other useful substantially extrudable hydrocarbon polymers include polyesters, polycarbonates, polyketones, and polyureas. Useful fluorine-containing polymers include crystalline or partially crystalline polymers such as copolymers of tetrafluoroethylene with one or more other monomers such as perfluoro(methyl vinyl) ether, hexafluoropropylene, perfluoro(propyl vinyl)ether; copolymers of tetrafluoroethylene with ethylenically unsaturated hydrocarbon monomers such as ethylene, or propylene.

Representative examples of polyolefins useful in this invention are polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene. Representative blends of polyolefins useful in this invention are blends containing polyethylene and polypropylene, low-density polyethylene and high-density polyethylene, and polyethylene and olefin copolymers containing the copolymerizable monomers, some of which are described above, e.g., ethylene and acrylic acid copolymers; ethyl and methyl acrylate copolymers; ethylene and ethyl acrylate copolymers; ethylene and vinyl acetate copolymers-, ethylene, acrylic acid, and ethyl acrylate copolymers, and ethylene, acrylic acid, and vinyl acetate copolymers.

The thermoplastic polymers may include blends of homo- and copolymers, as well as blends of two or more homo- or copolymers. Miscibility and compatibility of polymers are determined by both thermodynamic and kinetic considerations. A listing of suitable polymers may also be found in PCT published application WO2008/028134, which is incorporated in its entirety by reference.

The thermoplastic polymers may be used in the form of powders, pellets, granules, or any other melt-processable form. The particular thermoplastic polymer selected for use will depend upon the application or desired properties of the finished product. The thermoplastic polymer may be combined with conventional additives such as light stabilizers, fillers, staple fibers, anti-blocking agents and pigments. The three polymers are blended while both are in the molten state, meaning that the conditions are such (temperature, pressure) that the temperature is above the melting temperature (or softening temperature) of all of the polymers to ensure good mixing. This is typically done in an extruder. The polymers may be run through the extruder more than once to ensure good mixing to create discontinuous regions formed from the bulk polymer in the matrix polymer.

In one embodiment, the ratio of nanofiber (including both the bulk polymer and the third component) to matrix polymer is about 5% to about 90% by volume, preferably from 10% to about 70% vol, more preferably from 15% to about 60% vol, even more preferably from about 17% to about 50% vol. In another embodiment, the volume ratio is from about 100:1 to about 1:100, preferably, from about 40:1 to 1:40, more preferably from about 30:1 to about 1:30, even more preferably, from 20:1 to about 1:20; still even more preferably from 10:1 to 1:10; preferably from 3:2 to about 2:3. (4:1, 1:4) Preferably, the matrix polymer is the major phase comprising more than 50% by volume of the mixture.

Some preferred matrix polymer, bulk polymer, solvent combinations include, but are not limited to:

| Matrix polymer | Bulk polymer | Solvent (for matrix) |
|---|---|---|
| Polymethyl methacrylate (PMMA) | Polypropylene (PP) | Toluene |
| Cyclic olefin Copolymer | PP | Toluene |
| Cyclic Olefin copolymer | Thermoplastic Elastomer (TPE) | Toluene |
| Cyclic Olefin Copolymer | Polyethylene (PE) | Toluene |
| Cyclic Olefin Copolymer | Polymethylpentene | Toluene |
| Polystyrene (PS) | Linear Low density polyethylene (LLDPE) | Toluene |
| Nylon 6 | PP | Formic Acid |
| Nylon 6 | PE | Formic Acid |
| PS | Polyethylene terephthalate (PET) | Toluene |
| PET | PP | decomposition through hydrolysis |
| TPU (Thermoplastic Polyurethane) | PP | Dimethyl formamide (DMF) |
| TPU | PE | DMF |
| TPU | Nylon | DMF |
| poly(vinyl alcohol) (PVA) | PP | Water |
| Cyclic olefin | TPU | Toluene |
| PS | TPU | Toluene |
| Polycarbonate (PC) | Nylon | Toluene |
| PC | PP | Toluene |
| Polyvinyl chloride (PVC) | PP | Chloroform |
| Noryl (Polyphenyleneoxide) | PP | Toluene |

-continued

| Matrix polymer | Bulk polymer | Solvent (for matrix) |
|---|---|---|
| PPO and PS blend) Noryl | Nylon 6 | Chloroform |
| Polyacrylonitrilebutadiene-styrene (ABS) | Nylon 6 | Hexane |
| ABS | PP | Chloroform |
| PVC | Nylon | Benzene |
| Polybutyleneterephthalate (PBT) | PE | trifluoroacetic acid |

In one embodiment, the matrix polymer is polystyrene and the bulk polymer could be linear low density polyethylene (LLDPE), high density polyethylene (HDPE), isotactic polypropylene (iPP), polyethylene terephthalate (PET), polytrimethylene terephthalate (PTT), polybutylene terephthalate (PBT), poly(butylene adipate terephthalate) (PBAT), poly (Ethylene terephthalate-co-isophthalate)-poly(ethylene glycol) (IPET-PEG), and a highly modified cationic ion-dyeable polyester (HCDP).

In one embodiment, the matrix polymer is a water vapor permeable material such as PEBAX resin, a block copolymer of nylon a polyether, by Arkema or a water vapor permeable thermoplastic polyurethane (TPU). The nanofibers in the layer reinforce the layer and also serve as a moisture barrier. When this layer is laminated on a fabric via extrusion coating or calendaring, a breathable water proof fabric composite is created without the matrix polymer having to be removed.

The third component may be any suitable material, including but not limited to, reactive or non-reactive, such as a compatibilizer, a blooming agent, or a co-polymer such that at least part of the third component migrates to the interface between the first and matrix polymer in the first intermediate. Such a third component may be selected to be partially soluble or insoluble in the second solvent. This third polymer will be exposed on the surface of the first polymer after etching. Via further chemistry, the third component on the surface of the nanofiber may have added functionality (reactivity, catalytically functional, conductivity, chemical selectivity) or modified surface energy for certain applications. For example, in a PS/PP system (matrix polymer/bulk polymer), PP-g-MAH (maleated PP) or PP-g-PS, styrene/ethylene-butylene/styrene (SEBS) may be added to the system. The added MAH and the styrene functional groups may be further reacted to add increased polarity and functional groups to the resultant gradient nanofiber non-woven 10.

The third component may be any suitable material the blooms or moves to the surface of the bulk polymer when subjected to heat and extensional forces. In some embodiments, the third component may be a polymer, co-polymer, a large molecule, or a small molecule. Typically, the third component has a smaller molecular weight than the bulk polymer. In one embodiment, the third component has one-tenth the molecular weight of the bulk polymer. In another embodiment, the third component has one-thousandth the molecular weight of the bulk polymer. In another embodiment, the third component has one-millionth the molecular weight of the bulk polymer. As a general rule, the greater the difference between the molecular weights of the bulk polymer and third component, the greater the amount of bloom (which results in more of the third component at the surface of the nanofiber).

In one embodiment, the third component is a lubricant. The third component being a lubricant would help control the release properties of the nanofibers and non-woven. The third component being a lubricant also allows the nanofibers to more easily move across each other during consolidation giving better randomization. A lubricant could also alter the mechanical properties of the final non-woven structure.

In another embodiment, the third component is a molecule (or polymer) that contains reactive sites. This creates a gradient nanofiber non-woven with at least 70% of the nanofibers bonded to other nanofibers, where the nanofibers can be further reacted for additional functionality.

Another example would be the use of homopolypropylene and hyperbranched polymer grafted polypropylene (PP-HBP). The PP-HBP can be obtained by reacting Maleic anhydride grafted polypropylene with a hyperbranched polymer such as Boltorn E2 by Perstorp and functions as the third component with the homopolypropylene as the bulk polymer. Nylon 6 or another suitable polymer may be used as the matrix material. This combination of the materials would result in a product that provides controlled multifunctional surfaces for protective coatings, energetic materials, electronic, optoelectronics, sorbent, sensing, and repel/release applications. Another example would be the use of propylene maleic anhydride co-polymer as the third component. In combination with polypropylene as the bulk polymer and polystyrene as the matrix polymer, the resultant gradient nanofiber non-woven would contain bonded polypropylene nanofibers having modified surface energy. This could affect the improve bonding or further processing of the non-woven.

Small molecules that either insoluble or partially soluble in the bulk polymer will diffuse, e.g., bloom to the surface of the polymer. The rate at which the molecule blooms can be controlled by temperature, concentration, humidity etch depending on the specifics of the molecule and the bulk polymer properties. The controlled blooming additive can gives the bulk polymer controlled release property or provides the polymer surface with functional properties such as antistatic, hydrophilic, hydrophobic, flame retardant, colorant, antiscratch, conductive, and antimicrobial properties. The bloomed small molecules may create a self cleaning filter material that would resist biofouling; selective adsorption of an analyte of interest (for example as a headspace gas chromatography sample material); and delivery of a scent or aroma.

In one embodiment, the gradient nanofiber non-woven may contain a plurality of particles, including nano-particles, micron-sized particles or larger. "Nano-particle" is defined in this application to be any particle with at least one dimension less than one micron. The particles may be, but are not limited to, spherical, cubic, cylindrical, platelet, and irregular. Preferably, the nano-particles used have at least one dimension less than 800 nm, more preferably less than 500 nm, more preferably, less than 200 nm, more preferably less than 100 nm. The particles may be organic or inorganic.

Examples of suitable organic particles include buckminsterfullerenes (fullerenes), dendrimers, organic polymeric nanospheres, aminoacids, and linear or branched or hyperbranched "star" polymers such as 4, 6, or 8 armed polyethylene oxide with a variety of end groups, polystyrene, superabsorbing polymers, silicones, crosslinked rubbers, phenolics, melamine formaldehyde, urea formaldehyde, chitosan or other biomolecules, and organic pigments (including metallized dyes).

Examples of suitable inorganic particles include, but are not limited to, calcium carbonate, calcium phosphate (e.g., hydroxy-apatite), talc, mica, clays, metal oxides, metal hydroxides, metal sulfates, metal phosphates, silica, zirconia, titania, ceria, alumina, iron oxide, vanadia, antimony oxide, tin oxide, alumina/silica, zirconium oxide, gold, silver, cadmium selenium, chalcogenides, zeolites, nanotubes, quantum dots, salts such as $CaCO_3$, magnetic particles, metal-organic frameworks, and any combinations thereof.

In one embodiment, the particles are further functionalized. Via further chemistry, the third surface of the particles may have added functionality (reactivity, catalytically functional, electrical or thermal conductivity, chemical selectivity, light absorbtion) or modified surface energy for certain applications.

In another embodiment, particles are organic-inorganic, coated, uncoated, or core-shell structure. In one embodiment, the particles are PEG (polyethylene glycol) coated silica, PEG coated iron oxide, PEG coated gold, PEG coated quantum dots, hyperbranched polymer coated nano-clays, or other polymer coated inorganic particles such as pigments. The particles, in one embodiment, may melt and re-cool in the process of forming the nanofiber non-woven. The particles may also be an inorganic core-inorganic shell, such as Au coated magnetic particles. The particles, in one embodiment, may melt and re-cool in the process of forming the nanofiber non-woven. In another embodiment, the particles are ZELEC®, made by Milliken and Co. which has a shell of antimony tin oxide over a core that may be hollow or solid, mica, silica or titania. A wax or other extractable coating (such as functionalized copolymers) may cover the particles to aid in their dispersion in the matrix polymer.

The gradient nanofiber non-woven may also contain a support layer that that could be formed at the same time as the non-woven layer (such as through co-extrusion) or applied to the non-woven after the non-woven layer is created. If the supporting layer is co-extruded, then the supporting layer contains the supporting polymer which may be any suitable thermoplastic that is co-extrudable which the choice of bulk polymer and matrix polymer. The supporting polymer may be selected from the listing of possible thermoplastic polymers listed for the bulk polymer and the matrix polymer. In one embodiment, the supporting polymer is the same polymer as the matrix polymer or is soluble in the same solvent as the matrix polymer. This allows the matrix (matrix polymer) and the supporting layer (which is a sacrificial layer) to be removed at the same time leaving just the nanofibers in the nanofiber non-woven layer. In another embodiment, the supporting polymer is a different polymer than the matrix polymer and is not soluble in the same solvents as the matrix polymer. This produces a nano-composite on the supporting layer after removing the matrix polymer which is advantageous for applications that require a non-woven having increased dimensional stability and strength. The supporting layer decreases the edge effects of extruding or otherwise forming the nanofiber non-woven layer so that the size and density of the nanofibers is more even across the thickness (from the first side to the second side) of the gradient nanofiber non-woven.

In another embodiment, the gradient nanofiber non-woven contains at least one textile layer which may be any suitable textile layer. The textile layer may be on one or both sides of the gradient nanofiber non-woven, or between some layers of the gradient nanofiber non-woven. If more than one textile layer is used, they may each contain the same or different materials and constructions. In one embodiment, the textile layer is selected from the group consisting of a knit, woven, non-woven, and unidirectional layer. The textile layer provides turbulence of the molten mixture of the bulk and matrix polymer during extrusion and/or subsequent consolidation causing nanofiber movement, randomization, and bonding. The textile layer may be formed from any suitable fibers and/or yarns including natural and man-made. Woven textiles can include, but are not limited to, satin, twill, basket-weave, poplin, and crepe weave textiles. Jacquard woven textiles may be useful for creating more complex electrical patterns. Knit textiles can include, but are not limited to, circular knit, reverse plaited circular knit, double knit, single jersey knit, two-end fleece knit, three-end fleece knit, terry knit or double loop knit, warp knit, and warp knit with or without a micro denier face. The textile may be flat or may exhibit a pile. The textile layer may have any suitable coating upon one or both sides, just on the surfaces or through the bulk of the textile. The coating may impart, for example, soil release, soil repel/release, hydrophobicity, and hydrophilicity.

As used herein yarn shall mean a continuous strand of textile fibers, spun or twisted textile fibers, textile filaments, or material in a form suitable for knitting, weaving, or otherwise intertwining to form a textile. The term yarn includes, but is not limited to, yarns of monofilament fiber, multifilament fiber, staple fibers, or a combination thereof. The textile material may be any natural or man-made fibers including but not limited to man-made fibers such as polyethylene, polypropylene, polyesters (polyethylene terephthalate, polybutylene terephthalate, polytrimethylene terephthalate, polylactic acid, and the like, including copolymers thereof), nylons (including nylon 6 and nylon 6,6), regenerated cellulosics (such as rayon), elastomeric materials such as Lycra™, high-performance fibers such as the polyaramids, polyimides, PEI, PBO, PBI, PEEK, liquid-crystalline, thermosetting polymers such as melamine-formaldehyde (BASOFIL™) or phenol-formaldehyde (KYNOL™), basalt, glass, ceramic, cotton, coir, bast fibers, proteinaceous materials such as silk, wool, other animal hairs such as angora, alpaca, or vicuna, and blends thereof.

One process to form the gradient nanofiber non-woven 10 begins with blending the bulk polymer and the matrix polymer in a molten state along with the third component. The bulk polymer forms discontinuous regions in the matrix polymer with the third component blooming to the surface of the nanofiber. These discontinuous regions may be nano-, micro-, or larger sized liquid drops dispersed in the matrix polymer. This blend may be cooled or used directed in the next processing step. The bulk polymer is insoluble in the first solvent and the third component is more miscible in the bulk polymer than the matrix polymer.

Next, the polymer blend (heated if the polymer blend was cooled) is subjected to extensional flow and shear stress such that the bulk polymer forms nanofibers and the third component further blooms to the surface of the nanofiber. The majority of the nanofiber at the surface is the third component and the majority of the nanofiber at the center is the bulk polymer. The third component is in a gradient along the radius of the nanofiber from most concentrated at the surface of the nanofiber to least concentrated at the center of the nanofiber. It is this concentration gradient of the third component in the nanofiber that terms the nanofiber a "gradient nanofiber". The gradient nanofibers formed have an aspect ratio of at least 5:1 (length to diameter), more preferably, at least 10:1, at least 50:1, at least 100:1, and at least 1000:1. The gradient nanofibers are generally aligned along an axis, referred to herein as the "nanofiber axis".

Preferably, at least 80% of the gradient nanofibers are aligned within 20 degrees of this axis. After the extensional flow less than 30% by volume of the gradient nanofibers are bonded to other gradient nanofibers. This means that at least 70% of the gradient nanofibers are not bonded (adhered or otherwise) to any other gradient nanofiber. Should the matrix polymer by removed at this point, the result would be mostly separate, individual gradient nanofibers. In another embodiment, less than 20%, less than 10%, or less than 5% of the gradient nanofibers are bonded to other gradient nanofibers.

In one embodiment, the mixing of the bulk and matrix polymers and the third component and the extension flow may be performed by the same extruder, mixing in the barrel of the extruder, then extruded through the die or orifice. The extensional flow and shear stress may be from, for example, extrusion through a slit die, a blown film extruder, a round die, injection molder, or a fiber extruder. These materials may then be subsequently drawn further in either the molten or softened state.

Next, the molten polymer blend is cooled to a temperature below the softening temperature of the bulk polymer to preserve the gradient nanofiber shape. "Softening temperature" is defined to be the temperature where the polymers start to flow. For crystalline polymers, the softening temperature is the melting temperature. For amorphous polymers, the softening temperature is the Vicat temperature. This cooled molten polymer blend forms the first intermediate.

Next, the first intermediate is formed into a pre-consolidation formation. Forming the first intermediate into a pre-consolidation formation involves arranging the first intermediate into a form ready for consolidation. The pre-consolidation formation may be, but is not limited to, a single film, a stack of multiple films, a fabric layer (woven, non-woven, knit, unidirectional), a stack of fabric layers, a layer of powder, a layer of polymer pellets, an injection molded article, or a mixture of any of the previously mentioned. The polymers in the pre-consolidation formation may be the same through the layers and materials or vary.

In a first embodiment, the pre-consolidation formation is in the form of a fabric layer. In this embodiment, the molten polymer blend is extruded into fibers which form the first intermediate. The fibers of the first intermediate are formed into a woven, non-woven, knit, or unidirectional layer. This fabric layer may be stacked with other first intermediate layers such as additional fabric layers or other films or powders.

In another embodiment, the pre-consolidation formation is in the form of a film layer. In this embodiment, the molten polymer blend is extruded into a film which forms the first intermediate. The film may be stacked with other films or other first intermediate layers. The film may be consolidated separately or layered with other films. In one embodiment, the films are stacked such that the gradient nanofiber axes all align. In another embodiment, the films are cross-lapped such that the gradient nanofiber axis of one film is perpendicular to the gradient nanofiber axes of the adjacent films. If two or more films are used, they may each contain the same or different polymers. For example, a bulk/matrix PP/PS 80%/20% wt film may be stacked with a bulk/matrix PP/PS 75%/25% wt film. Additionally, a bulk/matrix PE/PS film may be stacked on a PP/PS film. Other angles for cross-lapping may also be employed.

In another embodiment, the pre-consolidation formation is in the form of a structure of pellets, which may be a flat layer of pellets or a three-dimensional structure. In this embodiment, the molten polymer blend is extruded into a fiber, film, tube, elongated cylinder or any other shape and then is pelletized which forms the first intermediate. Pelletizing means that the larger cooled polymer blend is chopped into finer components. The most common pelletizing method is to extrude a pencil diameter fiber, then chop the cooled fiber into pea-sized pellets. The pellets may be covered or layered with any other first intermediate structures such as fabric layers or film layers.

In another embodiment, the pre-consolidation formation is in the form of a structure of a powder, which may shaped into be a flat layer of powder or a three-dimensional structure. In this embodiment, the molten polymer blend is extruded, cooled, and then ground into a powder which forms the first intermediate. The powder may be covered or layered with any other first intermediate structures such as fabric layers or film layers.

In another embodiment, the pre-consolidation formation is in the form of a structure of an injection molded article. The injection molded first intermediate may be covered or layered with any other first intermediate structures such as fabric layers or film layers.

Additionally, the pre-consolidation formation may be layered with other layers (not additional first intermediates) such as fabric layers or other films not having nanofibers or embedded into additional layers or matrices. One such example would be to embed first intermediate pellets into an additional polymer matrix. The pre-consolidation layer may also be oriented by stretching in at least one axis.

Consolidation is conducted at a temperature is above the $T_g$ and the bulk and matrix polymers and within 50 degrees Celsius of the softening temperature of bulk polymer. More preferably, consolidation is conducted at 20 degrees Celsius of the softening temperature of the bulk polymer. The consolidation temperature upper limit is affected by the pressure of consolidation and the residence time of consolidation. For example, a higher consolidation temperature may be used if the pressure used is high and the residence time is short. If the consolidation is conducted at a too high a temperature, too high a pressure and/or too long a residence time, the fibers might melt into larger structures or revert back into discontinuous or continuous spheres.

Consolidating the pre-consolidation formation causes gradient nanofiber movement, randomization, and at least 70% by volume of the gradient nanofibers to fuse to other gradient nanofibers. This forms the second intermediate. This movement, randomization, and bonding of the gradient nanofibers may be accomplished two ways. The first being that the pre-consolidation formation contains multiple gradient nanofiber axes. This may arise, for example, from stacking cross-lapped first intermediate layers or using a non-woven, or powder. When heat and pressure is applied during consolidation, the nanofibers move relative to one another and bond where they interact. Another method of randomizing and forming the bonds between the gradient nanofibers is to use a consolidation surface that is not flat and uniform. For example, if a textured surface or fabric were used, even if the pressure was applied uniformly, the flow of the matrix and the nanofibers would be turbulent around the texture of the fabric yarns or the textured surface causing randomization and contact between the gradient nanofibers. If one were to simply consolidate a single layer of film (having most of the nanofibers aligned along a single nanofiber axis) using a press that delivered pressure perpendicular to the plane of the film, the nanofibers would not substantially randomize or bond and once the matrix was removed, predominately individual (unattached) nanofibers would remain.

In pre-consolidation formations such as powders or pellets the gradient nanofiber axes are randomized and therefore a straight lamination or press would produce off-axis pressure. The temperature, pressure, and time of consolidation would move the nanofibers between the first intermediate layers causing randomization and bonding of the gradient nanofibers. Preferably, at least 75% of the gradient nanofibers to bond to other gradient nanofibers, more preferably at least 85%, more preferably at least 90%, more preferably at least 95%, more preferably at least 98% vol. Consolidation forms the second intermediate, also referred to as the nano-composite.

At applied pressure and temperature, the matrix polymer is allowed to flow and compress resulting in bringing "off-axis" gradient nanofibers to meet at the cross over points and fuse together. Additional mixing flow of the gradient polymer may also be used to enhance the mixing and randomization of the off-axis fibers. One conceivable means is using a textured non-melting substrate such as a fabric (e.g. a non-woven), textured film, or textured calendar roll in consolidation. Upon the application of pressure, the local topology of the textured surface caused the matrix polymer melt to undergo irregular fluctuations or mixing which causes the direction of the major axis of the gradient nanofibers to alter in plane, resulting in off-axis consolidations. In a straight lamination or press process, due to the high melt viscosity and flow velocity, the flow of the matrix polymer melt is not a turbulent flow and cross planar flow is unlikely to happen. When the majority of the gradient nanofibers are in parallel in the same plane, the gradient nanofibers will still be isolated from each other, resulting in disintegration into individual gradient nanofibers upon etching. The second intermediate (also referred to as the nano-composite) may be used, for example, in reinforcement structures, or a portion or the entire matrix polymer may be removed.

Next, optionally, at least a portion of the matrix polymer from the nano-composite creating the gradient nanofiber non-woven 10. A small percentage (less than 30% by volume) may be removed, most, or all of the matrix polymer may be removed. If just a portion of the matrix polymer is removed, it may be removed from the outer surface of the intermediate leaving the nano-composite having a nanofiber non-woven surrounding the center of the article which would remain a nano-composite. The removal may be across one or more surfaces of the second intermediate or may be done patternwise on the second intermediate. Additionally, the matrix polymer may be removed such that there is a concentration gradient of the matrix polymer in the final product with the concentration of the matrix polymer the lowest at the surfaces of the final product and the highest in the middle of the final product. The concentration gradient may also be one sided, with a concentration of the matrix polymer higher at one side.

If essentially the entire or the entire matrix polymer is removed from the second intermediate, what remains is a gradient nanofiber non-woven as shown in FIG. 1, where at least 70% volume of the gradient nanofibers are bonded to other gradient nanofibers. While the resultant structure is described as a gradient nanofiber non-woven, the resultant structure may consist of a non-woven formed from bonded nanofibers and resemble a film more than a non-woven. The bonding between the gradient nanofibers provides physical integrity for handling of the etched films/non-woven in the etching process which makes the use of a supporting layer optional. Smearing and/or tearing of the nanofibers upon touching is commonly seen in the poorly consolidated second intermediates. The matrix polymer may be removed using a suitable first solvent or decomposition method described above.

The benefit of the process of consolidating the pre-consolidation layer is the ability to form the bonds between the gradient nanofibers without losing the nanofiber structure. If one were to try to bond the gradient nanofibers in a nanofiber non-woven, when heat is applied, the gradient nanofibers would all melt together and the gradient nanofiber structure would be lost. This would occur when the heat is uniform, such as a lamination or nip roller, or is specific such as spot welding or ultrasonics.

In one embodiment, the gradient nanofiber non-woven 10 may contain additional microfibers and/or engineering fibers. Engineering fibers are characterized by their high tensile modulus and/or tensile strength. Engineering fibers include, but are not limited to, E-glass, S-glass, boron, ceramic, carbon, graphite, aramid, poly(benzoxazole), ultra high molecular weight polyethylene (UHMWPE), and liquid crystalline thermotropic fibers. The use of these additional fibers in the composites and non-wovens/films may impart properties that may not be realized with a single fiber type. For example, the high stiffness imparted by an engineering fiber may be combined with the low density and toughness imparted by the nanofibers. The extremely large amount of interfacial area of the nanofibers may be effectively utilized as a means to absorb and dissipate energy, such as that arising from impact. In one embodiment a nanofibers mat comprised of hydrophobic nanofibers is placed at each of the outermost major surfaces of a mat structure, thereby forming a moisture barrier for the inner layers. This is especially advantageous when the inner layers are comprised of relatively hydrophilic fibers such as glass.

In one embodiment, the bonded gradient nanofibers may improve the properties of existing polymer composites and films by providing nanofiber-reinforced polymer composites and films, and corresponding fabrication processes that have a reduced coefficient of thermal expansion, increased elastic modulus, improved dimensional stability, and reduced variability of properties due to either process variations or thermal history. Additionally, the increased stiffness of the material due to the nanofibers may be able to meet given stiffness or strength requirements.

The bonded gradient nanofibers of the gradient nanofiber non-woven may be used in many known applications employing nanofibers including, but not limited to, filter applications, catalysis, adsorbtion and separation applications, computer hard drive applications, biosensor applications and pharmaceutical applications. The nanofibers are useful in a variety of biological applications, including cell culture, tissue culture, and tissue engineering applications. In one application, a nanofibrillar structure for cell culture and tissue engineering may be fabricated using the nanofibers of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-component non-woven comprising a plurality of thermoplastic nanofibers each having a surface and a center, wherein at least 70% of the thermoplastic nanofibers are thermally bonded to other thermoplastic nanofibers, wherein the thermoplastic nanofibers comprise a bulk thermoplastic polymer and an additional component, wherein the additional component comprises a molecule having reactive sites, wherein the majority by weight at and on the surface of the thermoplastic nanofiber is the additional component and the majority by weight at the center of the thermoplastic nanofiber is the bulk thermoplastic polymer, and wherein there is a concentration gradient of the additional component from most concentrated to least from the surface of the thermoplastic nanofiber to the center of the thermoplastic nanofiber.

2. The multi-component non-woven of claim 1, wherein the multi-component non-woven further comprises a second thermoplastic polymer at least partially encapsulating the nanofibers.

3. The multi-component non-woven of claim 1, wherein the bulk thermoplastic polymer has a weight-average molecular weight at least 1000× the weight-average molecular weight of the additional component.

4. The multi-component non-woven of claim 1, wherein the additional component is located between the bonds of the thermoplastic nanofibers.

5. The multi-component non-woven of claim 1, wherein the multi-component non-woven further comprises additional fibers having a different size or chemical composition than the thermoplastic nanofibers.

6. The multi-component non-woven of claim 1, wherein at least 85% by volume of the thermoplastic nanofibers are thermally bonded to other thermoplastic nanofibers.

7. A multi-component non-woven comprising a plurality of thermoplastic nanofibers each having a surface and a center, wherein at least 70% of the thermoplastic nanofibers are thermally bonded to other thermoplastic nanofibers, wherein the thermoplastic nanofibers comprise a bulk thermoplastic polymer and an additional component, wherein the additional component comprises a lubricant, wherein the majority by weight at and on the surface of the thermoplastic nanofiber is the additional component and the majority by weight at the center of the thermoplastic nanofiber is the bulk thermoplastic polymer, and wherein there is a concentration gradient of the additional component from most concentrated to least from the surface of the thermoplastic nanofiber to the center of the thermoplastic nanofiber.

8. The multi-component non-woven of claim 7, wherein the bulk thermoplastic polymer has a weight-average molecular weight at least 1000× the weight-average molecular weight of the additional component.

9. The multi-component non-woven of claim 7, wherein the additional component is located between the bonds of the thermoplastic nanofibers.

10. The multi-component non-woven of claim 7, wherein the multi-component non-woven further comprises additional fibers having a different size or chemical composition than the thermoplastic nanofibers.

11. The multi-component non-woven of claim 7, wherein at least 85% by volume of the thermoplastic nanofibers are thermally bonded to other thermoplastic nanofibers.

12. A multi-component non-woven comprising a plurality of thermoplastic nanofibers each having a surface and a center, wherein at least 70% of the thermoplastic nanofibers are thermally bonded to other thermoplastic nanofibers, wherein the thermoplastic nanofibers comprise a bulk thermoplastic polymer and an additional component, wherein the majority by weight at and on the surface of the thermoplastic nanofiber is the additional component and the majority by weight at the center of the thermoplastic nanofiber is the bulk thermoplastic polymer, wherein the bulk thermoplastic polymer has a weight-average molecular weight at least 1000× the weight-average molecular weight of the additional component, and wherein there is a concentration gradient of the additional component from most concentrated to least from the surface of the thermoplastic nanofiber to the center of the thermoplastic nanofiber.

13. The multi-component non-woven of claim 12, wherein the additional component is located between the bonds of the thermoplastic nanofibers.

14. The multi-component non-woven of claim 12, wherein the multi-component non-woven further comprises additional fibers having a different size or chemical composition than the thermoplastic nanofibers.

15. The multi-component non-woven of claim 12, wherein at least 85% by volume of the thermoplastic nanofibers are thermally bonded to other thermoplastic nanofibers.

16. The multi-component non-woven of claim 12, wherein the additional component comprises a lubricant.

17. The multi-component non-woven of claim 12, wherein the additional component comprises a polymer.

18. The multi-component non-woven of claim 12, wherein the additional component comprises a molecule having reactive sites.

* * * * *